United States Patent [19]

Apothaker

[11] Patent Number: 5,475,609

[45] Date of Patent: Dec. 12, 1995

[54] LOAD INTERRUPTER SYSTEM

[75] Inventor: Richard L. Apothaker, Northfield, N.J.

[73] Assignee: Square D Company, Palatine, Ill.

[21] Appl. No.: 26,864

[22] Filed: Mar. 5, 1993

[51] Int. Cl.$^6$ .................................................. G01R 35/00
[52] U.S. Cl. ............................................ 364/492; 364/483
[58] Field of Search ....................................... 364/480, 481,
364/483, 487, 492; 361/1, 18, 35, 78, 79,
86, 87, 30; 324/511

[56] References Cited

U.S. PATENT DOCUMENTS

| | | | |
|---|---|---|---|
| 3,764,995 | 10/1973 | Helf, Jr. et al. | 324/73 X |
| 4,245,318 | 1/1981 | Eckart et al. | 364/481 |
| 4,371,947 | 2/1983 | Fujisawa | 395/750 |
| 4,432,031 | 2/1984 | Premerlani | 364/483 X |
| 4,672,501 | 6/1987 | Bilac et al. | 361/96 |
| 4,694,373 | 9/1987 | Demeyer | 361/96 |
| 4,694,374 | 9/1987 | Verbanets, Jr. | 361/96 |
| 4,751,605 | 6/1988 | Mertz et al. | 361/91 |
| 4,780,786 | 10/1988 | Weynachter et al. | 361/87 |
| 4,864,287 | 9/1989 | Kierstead | 340/648 |
| 4,870,531 | 9/1989 | Danek | 361/93 |
| 4,945,443 | 7/1990 | DeBiasi et al. | 361/93 |
| 4,958,252 | 9/1990 | Murphy | 361/93 |
| 4,967,304 | 10/1990 | Dougherty | 361/31 |
| 4,991,042 | 2/1991 | Tokarski et al. | 361/93 |
| 4,996,625 | 2/1991 | Soma et al. | 361/87 |
| 5,023,801 | 6/1991 | Mattera et al. | 364/480 |
| 5,038,246 | 8/1991 | Durivage, III | 361/93 |
| 5,087,870 | 2/1992 | Salesky et al. | 361/18 X |
| 5,101,316 | 3/1992 | Levain | 361/93 |
| 5,113,304 | 5/1992 | Ozaki et al. | 361/87 |
| 5,121,282 | 6/1992 | White | 361/42 |
| 5,136,458 | 8/1992 | Durivage, III | 361/93 |
| 5,245,496 | 9/1993 | Kim et al. | 361/30 |
| 5,340,964 | 8/1994 | Galloway et al. | 361/87 X |

*Primary Examiner*—Emanuel T. Voeltz
*Assistant Examiner*—M. Kemper
*Attorney, Agent, or Firm*—Larry I. Golden; Kareem M. Irfan

[57] ABSTRACT

An associative current interrupter system provides improved circuit protection and electrical safety. A test control unit (200) applies a regulated series of input voltage levels to the appliance (300) which is to be subsequently protected under a series of minimum and maximum load sequences. The resulting data series is logged and compressed into a format suitable for downloading into a programmable interrupter (100). A remote interface (217) is provided to allow device-specific data series to be input from alternative sources. When the appliance is connected in series with the interrupter (100), load current, line voltage, and time constraints are sampled and compared to the data series, thus providing a continuous solution to the determination of normal vs. abnormal currents. An output relay (103) provides a switching element and an internally accessible calibration port (111) allows monitoring combined non-linearities for correction during manufacture.

19 Claims, 3 Drawing Sheets

ASSOCIATIVE TEST CONTROL UNIT

ELECTRICAL LOAD MONITOR AND PROGRAMMABLE INTERRUPTER

LOAD INTERRUPTER SYSTEM

FIELD OF THE INVENTION

The present invention relates generally to circuit interrupters, and, more particularly, to microprocessor based embodiments of the same typically employed to protect commercial, industrial, and residential electrical systems and appliances connected thereto in addition to their environments.

BACKGROUND OF THE INVENTION

Fuses, circuit breakers and circuit interrupters are designed to respond to detected power faults, which, in most cases, corresponds to disconnecting a source from its load (in such cases, an appliance or the like). The disconnect may take a variety of forms such as a melted fusing link, a mechanically opened contact or an electronically opened driver. Advances in these forms have raised the mechanism of disconnection to a well known art.

Apart from the disconnect type, all such devices have the common requirements of sensing circuit currents and reacting when abnormal conditions are detected. As a consequence, the method of determination of normal/abnormal conditions assumes a primary role. Early devices relied upon thermal, magnetic, pneumatic and other physical properties or structures to establish a limit or range of normal/abnormal current. The subsequent inclusion of logic and microprocessor circuits allowed such determinations to advance in complexity by many orders of magnitude. Such advances have introduced a wide range of features.

For instance, overcurrent, underfrequency and undervoltage limits (U.S. Pat. Nos. 4,371,947 and 4,672,501) for primary use in feeder/transmission networks used single equation solutions for trip-times, limits and other constraints. By definition, networks allow an essentially unlimited number and type of loads making any solution representative of the network constraints, as opposed to the load specifics. This approach has persisted to the lowest levels of the power transmission tree—the residential wall outlet.

Intermediate level protectors, typically residential and industrial circuit breakers, offer a wide range of functions. The inclusion of phase faults, ground faults and load restoration (U.S. Pat. No. 4,694,373) added additional sensing features. Load type-specific parameters (U.S. Pat. Nos. 4,967,304 and 4,864,287 and 4,694,374), such as trip-time curves, field excitation limits and pressure sensing broadened the variables. Reliability indicators (U.S. Pat. Nos. 4,958,252 and 4,780,786) of contact condition was provided by storing trip/wear data history. Various forms of security (U.S. Pat. Nos. 4,945,443 and 4,870,531) against setpoint tapering was provided. More functions (U.S. Pat. Nos. 5,136,458 and 5,113,304 and 5,038,246 and 4,991,042) were added, including remote communication links, simulated thermal memories, interchangeble rating plugs, fault magnitude as response modifiers and interlocked selection algorithms. The useful features named above were well-conceived but, again, were defined within the constraints of a network solution.

Attempts to deal with a specific fault type (U.S. Pat. No. 5,121,282), such as an arcing fault, require detailed analysis of an often location-specific fault. Such analysis is generally not possible in the presence of other accompanying conditions. Another complicating factor in such analysis is the wide variety of load (appliance) types, constructions and functions. Clearly, detailed knowledge and understanding of the exact appliance in use is required for the most appropriate protection scheme. Such an approach (U.S. Pat. No. 4,996,625) asserts this mode of solution but only within the secondary circuits of a specific device.

The existing body of art has addressed the problem of electrical safety, particularly the interruption of fault currents, within the context of a transmission network where, over a long enough time frame, given a large enough number of devices in use, all current levels from zero to maximum will be encountered. While such logic is required of large power transmission networks, it imposes severe and unnecessary limitations when applied at the lowest levels of the network, typically the residential wall outlet. At this level, electrical failures are not statistical events with unknown origins and consequences; but rather they are as logical as the normal operation expected of the devices. Failure analysis can be absolute, provided there is enough of the device left to analyze. Cause and effect is always present, often with clear warning events preceding the actual final damage. Increasingly complex apparatus, instruments, and appliances not only operate in more complex sequences, they can also fail in more complex and subtle ways. It is therefore apparent that the existing body of knowledge and art suffer from the disadvantages listed in paragraphs (a) through (e) below.

(a) There is little attention given to the method or form by which present interrupters determine normal/abnormal currents as it directly relates to the specific appliance in use. The performance characteristics of existing interrupters are carefully defined, but only with respect to themselves, thus requiring the appliance to fail in a manner appropriate to detection. Given the wide range of available appliances, it follows that no single-solution interrupter can provide effective protection against all except the most conspicuous faults. Responsibility falls to the user or specified to select an interrupter, usually based solely on its trip rating, with little or no detailed knowledge of the device to be protected.

(b) It is widely known that relatively minor changes in current within an appliance, which are often the first warning signs of problems, are extremely difficult to distinguish from normal fluctuations. Such fluctuations often originate in the fact that various types of appliances react quite differently to changes in applied line voltage, even when such changes are well within normal limits. No attempt is made to correlate applied voltage with current under normal conditions. Additional variables which may affect the appliance, such as external loading, are similarly not taken into account. The resulting changes in current can easily swamp subtle, underlying changes in current indicative of a fault. One of the most common examples of this effect is a faulty wire connection within an appliance which, as a resistive function of its mechanical fault, begins to heat. The rise in internal temperature of the junction further raises its resistance. This type of self-destructive cycle often continues until fire results in destruction of the device itself, and often, worse. During the early stages of such an event, total current through the circuit would drop (caused by the voltage drop across the faulty connector), making detection by existing interrupters extremely difficult and unreliable.

(c) The issue of where and how an interrupter is most appropriately located in a circuit is not addressed. Although it is known that many electrical faults involve cords, extensions, plugs, outlets, and the like in addition to internal failures of various types within the appliance, interrupters are generally found only at extreme ends of the circuit, such as at a power distribution panel of the supply or perhaps at a fuse or mechanical breaker within the appliance. Considering the discussion in (b) above, physical placement of an interrupter is critical. The existing range of physical embodiments of interrupters severely limits such flexibility.

(d) No process or form is represented to allow for the consideration of relative changes in operating characteristics of a given appliance over time. Such changes often include warm-up cycles, long and short-term current drift, current noise, variation in timing cycles, and others. In many cases, these types of changes are very advanced precursors of developing fault conditions. The lack of qualitative judgment in existing interrupters makes such considerations ill-conceived.

(e) No clear information pathways from appliances to interrupters exist. Following the discussions in (a) through (d) above, it follows that the logical source of expert specifications relating to the appliance is the manufacturer. Such data is often internally available from most manufacturers in the form of test data, design limits, quality control limits, failure analysis, and the like. Additional data is available from various industrial safety organizations and agencies. In combination, such pathways would allow an interrupter to perform as an optimum safety device.

SUMMARY OF THE INVENTION

Accordingly, keeping in view the foregoing disadvantages, some illustrative objects and advantages of the present invention over the prior art are:

(a) to provide a system and method by which the appliance in use has directly defined normal vs. abnormal currents upon which an interrupter may act;

(b) to provide a system and method by which the determination of normal vs. abnormal circuit current is directly related to normal limits of line voltage and further conditioned by loading limits;

(c) to provide a system and method by which the interrupter may be placed at the most advantageous location to promote general safety;

(d) to provide a system and method for determining the relative change in operating characteristics of a given appliance over time, where such change is often a measure of continuing safety; and (e) to provide a system and method which support a clear information pathway between appliance and interrupter.

Still further objects and advantages will become apparent from a consideration of the ensuing description and drawings.

BRIEF DESCRIPTION OF THE DRAWINGS

For the convenience of the reader, set forth below is a listing of key components identified in the drawings, along with the corresponding reference numerals.

Figure 1:
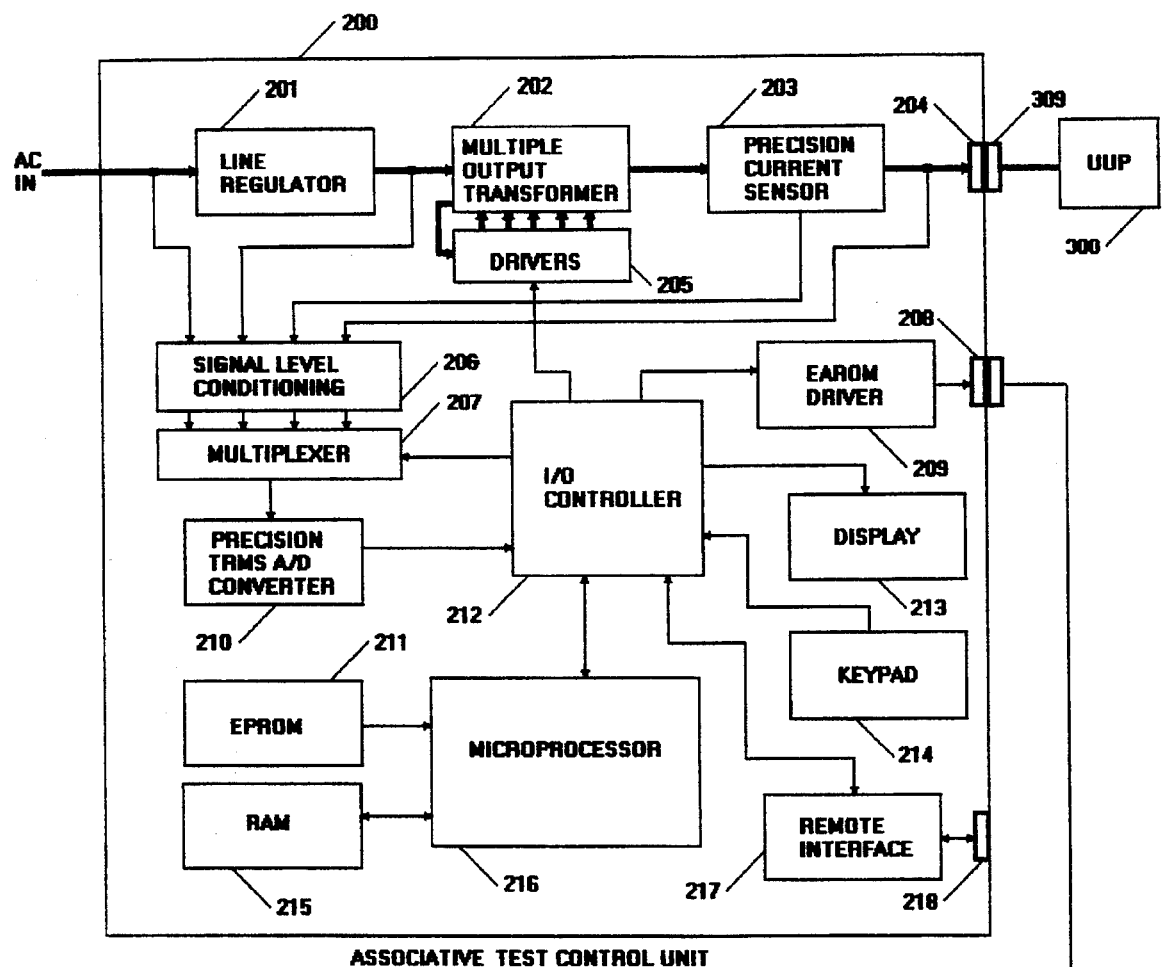
FIG. 1 is a functional block diagram showing various aspects of an electrical load monitor and programmable interrupter connected to an associative test control unit.
Figure 1:
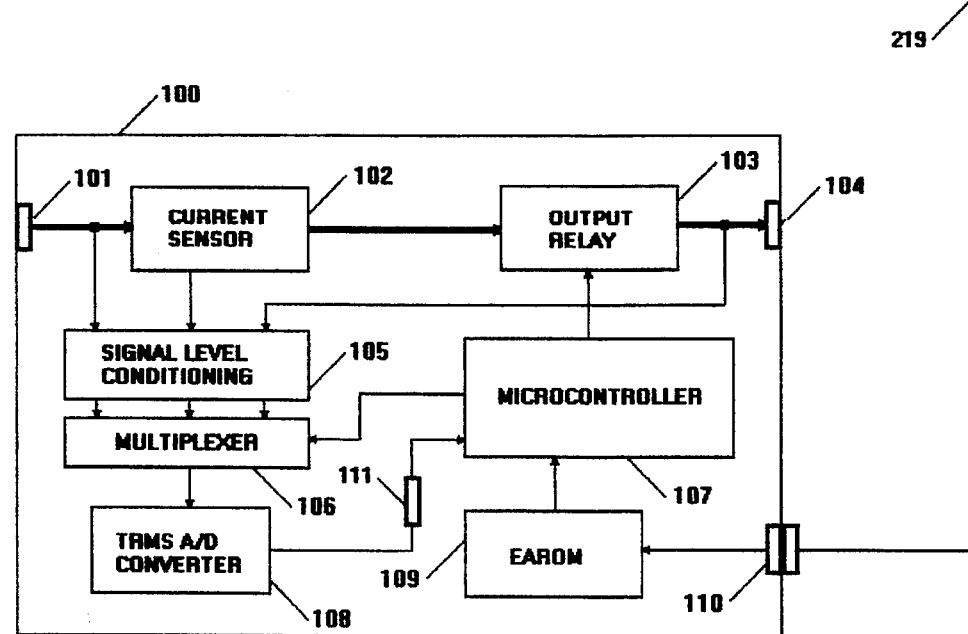

| Reference Numerals In Drawings | |
|---|---|
| 100 ELMPI | 200 associative test control unit |
| 101 AC input | 201 line regulator |
| 102 current sensor | 202 multiple output transformer |
| 103 output relay | |
| 104 AC output | 203 precision current sensor |
| 105 signal level conditioning | 204 AC output receptacle |
| 106 multiplexer | 205 transformer drivers |
| 107 microcontroller | 206 signal level conditioning |
| 108 Trms A/D converter | 207 multiplexer |
| 109 EAROM | 208 EAROM output port |
| 110 EAROM input port | 209 EAROM driver |
| 111 internal calibration port | 210 precision Trms A/D converter |
| 300 UUP (unit under protection) | |
| 301 ELMPI module | 211 EPROM |
| 302 ELMPI cord end | 212 I/O controller |
| 303 ELMPI outlet | 213 display |
| 304 ELMPI breaker | 214 keypad |
| 305 outlet | 215 RAM |
| 306 specifications | 216 microprocessor |
| 307 ratings | 217 remote interface |
| 308 programming sources cable | 218 serial port |
| 309 male AC plug | 219 EAROM programming |
| 310 programming input port | |

DETAILED DESCRIPTION OF THE PREFERRED EMBODIMENTS

Figure 2:
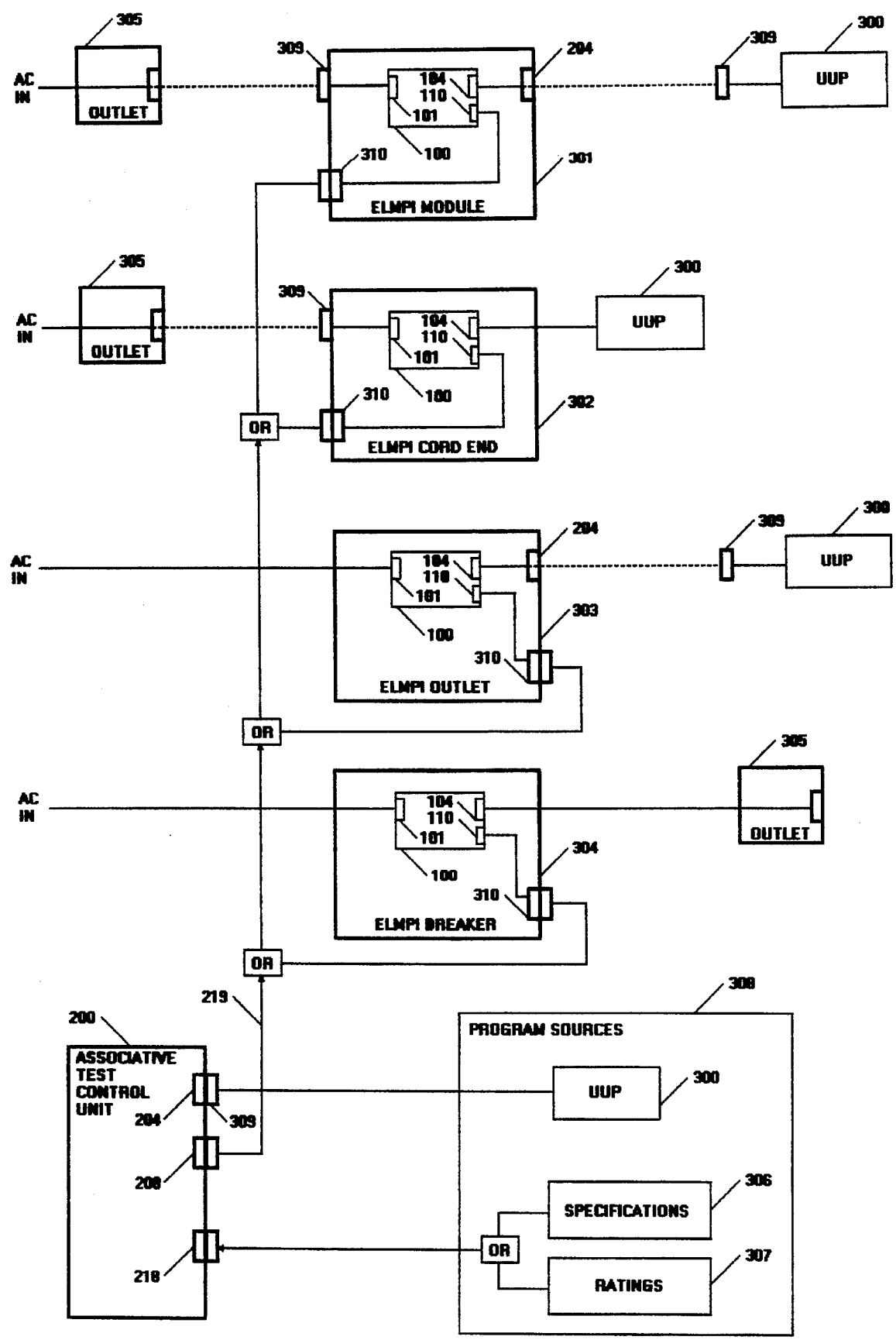
FIG. 2 is a functional block diagram showing the overall system of interconnection and use.

FIG. 1 (lower portion) details internal aspects of an electrical load monitor and programmable interrupter (ELMPI) 100, which assembly forms the core building block for subsequent implementations as shown in FIG. 2. In a preferred embodiment, ELMPI 100 is fabricated as a single, small, low cost printed circuit board assembly. The major current path begins at AC input 10 1, typically a pad layout on the circuit board, passing through current sensor 102 prior to connection. Current sensor 102 is typically a non-contact current transformer in a general toroidal configuration. Current flow is switched by output relay 103, typically a 15A, SPDT relay connected through normally open contacts. Relay 103 is under direct control of microcontroller 107. The major current path is completed to AC output 104, similar in form to input 10 1. Signal level conditioning 105 consists of circuitry to normalize the sampled values of input voltage, total current, and output voltage to manageable analog levels. Multiplexer 106, under control of microcontroller 107, selects the desired signal for conversion by Trms A/D converter 108. The results of such conversions are input to microcontroller 107 and are also made available via internal calibration port 111. An electrically alterable read-only memory (EAROM) 109 receives its initial data by way of EAROM input port 110. Once entered, such data becomes input to microcontroller 107. As the central control element, microcontroller 107 is typically a low cost, 8 bit, general purpose microcontroller (typified by the 8051 family of controllers offered by Intel Corp., Santa Clara, Calif.).

FIG. 1 (upper portion) details internal aspects of an associative test control unit (ATCU) 200. In a preferred embodiment, ACTU 200 is constructed as a complete, self-contained package, easily transportable by hand. As the major current path, input voltage (e.g. typical household 115 VAC) is connected through usual connective components (not shown) to line regulator 201, typically a constant voltage output transformer. The output of line regulator 201 is supplied to multiple output transformer 202, whose selection taps are controlled by drivers 205, which is in turn controlled by I/O controller 212. The major current path is completed through precision current sensor 203 to AC output receptacle 204, typically a common, single position outlet. Signal level conditioning 206 consists of circuitry to normalize the sampled values of input voltage, regulated voltage, total current, and output voltage to manageable analog levels. Multiplexer 207, under control of I/O controller 212, selects the desired signal for conversion by precision Trms A/D converter 210. The results of such conversions are input to I/O controller 212. EAROM driver 209, controlled by I/O controller 212, interfaces signal levels with typical EAROM devices through EAROM output port 208. Display 213, under control of I/O controller 212, is typically an integrated, dot matrix/graphics, vacuum fluorescent display with internal controller. Keypad 214 is typically a membrane type, four by four, with numerics and limited functions, whose output is received by I/O controller 212. Remote interface 217, typically an RS-232 type controller, provides remote asynchronous communication with an auxiliary data system via serial port 218. Such communication sequences are initiated under direction of I/O controller 212. An erasable programmable read-only memory (EPROM) 211 provides fixed read-only data, typically operating software, upon which microprocessor 216 operates. A random access memory (RAM) 215 provides microprocessor 216 with read/write storage area, typically for logging data. As the central control elements of ATCU 200, microprocessor 216 and I/O controller 212 are typically a general purpose, 16 bit microprocessor and associated controller (typified by the MC68xx family offered by Motorola, Inc., Phoenix, Ariz.).

ELMPI 100 and ATCU 200 are shown interconnected by EAROM programming cable 219, which may be disconnected from either or both ends. A unit under protection (UUP) 300 with integral male AC plug 309 is shown connected to AC output receptacle 204. The UUP 300 is the actual device which is to be protected.

FIG. 2 is a functional block diagram showing the overall system of interconnection and use. At the lower portion of the figure is shown ATCU 200, described previously, linked to program sources 308 which can be described as those sources able to provide expert, device specific, real-time operating data relating to UUP 300. UUP 300 is connected directly to AC output receptacle 204 through its integral cord and male AC plug 309. Specifications 306, generally available to the original manufacturer of UUP 300, or ratings 307, such as those under agency or safety organization control, may be transmitted to ATCU 200 via serial port 218. EAROM programming cable 219, shown with one end connected to EAROM output port 208, is able to connect to ELMPI breaker 304 or ELMPI outlet 303 or ELMPI cord end 302 or ELMPI module 301.

ELMPI module 301, a utilization of ELMPI 100 contained within, consists additionally of male AC plug 309, AC output receptacle 204, and programming input port 310. In a preferred embodiment, a small enclosure (module) houses all components and plugs directly into a conventional wall outlet during use, shown functionally as outlet 305. UUP 300, through its integral male AC plug 309, is connected to AC output receptacle 204. In short, ELMPI module 301 is a safety interrupter connected between a wall outlet and the device to be protected.

ELMPI cord end 302, another utilization of ELMPI 100 contained within, consists additionally of male AC plug 309 and programming input port 310. In a preferred embodiment, a small housing encloses all components and is permanently attached to the cord end of UUP 300. Connection is again made to outlet 305. In short, ELMPI cord end 302 replaces the male plug on the power cord of the device to be protected.

ELMPI outlet 303, another utilization of ELMPI 100 contained within, consists additionally of AC output receptacle 204, and programming input port 310. In a preferred embodiment, all components are enclosed in a small housing which is mechanically suitable for mounting within a standard wall outlet junction box. Connection points, typically trailing wires, are available for connection to line voltage (AC in) wiring present within the junction box. Subsequent connection of UUP 300 with integral male AC plug 309 is made to AC output receptacle 204. In short, ELMPI outlet 303 replaces the convential wall outlet receptacle.

ELMPI breaker 304, another utilization of ELMPI 100 contained within, consists additionally of programming input port 310. In a preferred embodiment, all components are enclosed in a molded housing which is mechanically suitable for mounting within standard configurations of electrical distribution panels. Electrical contacts appropriate for such configurations are additionally provided. In short, ELMPI breaker 304 replaces convential circuit breakers.

The interrupter system embodying the invention is based on the concept of logging the actual current-time profile of an operating device while controlling its input voltage through a series of maximum vs. minimum load sequences. The results of such a data series, when applied in the inverse, form a continuous solution to the complex relationships of voltage, current, time, load variables, and operating instabilities. The interrupter system embodying this invention performs its function in four distinct modes; acquisition of performance data relating to the specific device to be protected, reduction of such data to a compressed format consistent with the general type of device to be protected, downloading of the compressed data into the interrupter, and operation of the interrupter while the device to be protected is connected to it.

FIG. 1 illustrates the functional relationship between load, test unit, and interrupter during the first three modes of operation. ACTU 200, under central control of microprocessor 216 and I/O controller 212, operates under direction of control software stored initially in EPROM 211. Such software remains resident. Display 213 and keypad 214, under direction of control software, provide menu-driven communication with the user/operator. The primary current path established by regulator 201, transformer 202, sensor 203, receptacle 204, plug 309, and UUP 300 operates as follows; AC input voltage is generally expected to fluctuate within the range of 105–125 V. Regulator 201 provides a stabilized output (typically ±1 V at a nominal 115 V output) to transformer 202. Transformer 202, by virtue of its multiple taps under control of drivers 205, is able to generate a number of discrete output voltages, typically five or more. Since drivers 205 are under software control, the output voltages thus generated can be ordered in a series of steps. Such voltage steps, when applied to the load as shown, result in a highly characteristic series of currents induced by the actual load in use (further discussion follows using FIGS. 3 to 6).

The sensing loop, comprising signal level conditioning 206, multiplexer 207, converter 210, and I/O controller 212, samples AC input voltage, internally regulated AC voltage, stepped AC output voltage, and load current. The sampled values are properly scaled, selected, converted to Trms data, and read through I/O controller 212 to microprocessor 216, where all functions are under software control. Such values are logged into storage, typically RAM 215, for subsequent processing. Once processed and compressed, such values are downloaded through EAROM driver 209 to be ultimately 'burned' into EAROM 109 contained within ELMPI 100. An alternate path to acquire such values is through the serial port 218 and remote interface 217, which together form a standard RS-232 communications link.

FIGS. 3 to 6 are timing diagrams illustrating the test sequences and sampling relationships. Under program control, the user/operator is instructed to perform three test sequences, each requiring the appliance to be operated over at least one complete cycle. The first sequence is performed with the appliance under minimum load, which varies with the type of appliance. During this sequence the AC voltage applied is held constant at a nominal center value. The second sequence is also performed under minimum load but the applied AC voltage is stepped through a range of values. The third sequence is performed under maximum load and the applied AC voltage is again stepped through a range of values.

Figure 3:
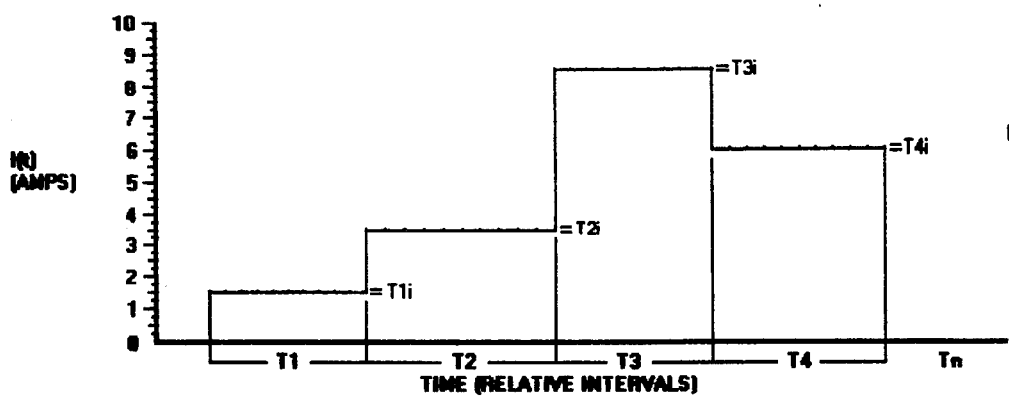
FIG. 3 is a timing diagram showing a typical time-current response, at minimum loading, at a single regulated line voltage.

FIG. 3 depicts total current I(t) vs. time for the first test sequence, which is performed with the appliance under minimum load. This relationship is plotted by continuous acquisition of data points over the total run time. Compression by means of adjacent point averaging is performed when allotted memory capacity is approached. Following the total run, differentiation of intervals is performed by applying successively diminishing threshold tests. Time intervals T1 through Tn are representative of a typical appliance operating sequence. It can be appreciated that the sequence will be more or less complex depending upon the specific appliance, where each time interval represents a specific cycle within the appliance. The current within each interval remains constant as a function of line voltage but varies as a result of instabilities within the appliance, which are shown as T1$i$ through T4$i$. The plot (sequence one) in FIG. 3 is also depicted in FIG. 4.

Figure 4:
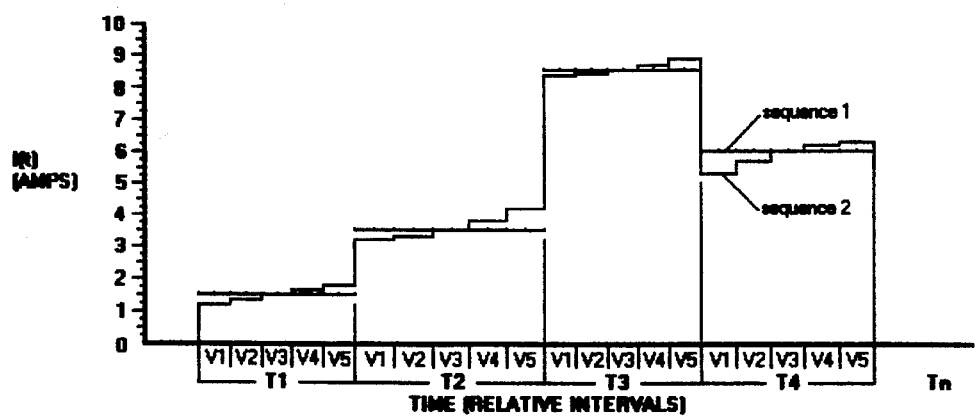
FIG. 4 is a timing diagram showing a stepped line voltage response, at minimum loading, superimposed over the time-current response in FIG. 3.

In addition to sequence one, FIG. 4 depicts I(t) vs. time for the second test sequence, which is also performed under minimum load. The total run time and intervals determined in sequence one allow each time interval to be further divided into intervals shown as V1 through V5. During each such interval, a specific AC voltage is applied, sensed, and logged. The resulting currents are plotted as the step waveforms within each time interval. These step waveforms are shown superimposed over the sequence one response. It can be seen that the expected overlap occurs within V3 of each time interval. The step response (sequence two) in FIG. 4 is also shown in FIG. 5.

Figure 5:
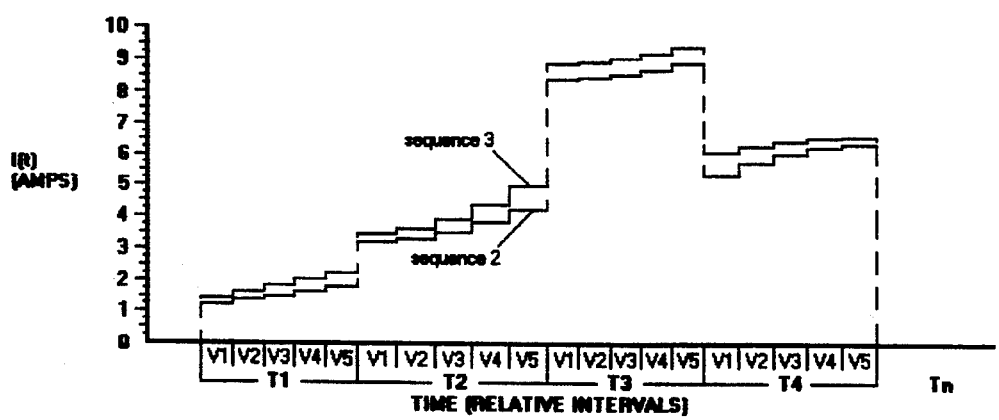
FIG. 5 is a timing diagram showing a composite of stepped line voltage responses taken separately at minimum and maximum loading.

In addition to sequence two, FIG. 5 depicts I(t) vs. time for the third test sequence, which is performed under maximum load. The same voltage steps and timings are repeated and logged. The resulting step waveforms are shown combined with those obtained during sequence two. It can be appreciated that the differences between these two step responses, within each time interval, represent the true dynamics of the appliance under varying conditions of line voltage and loading over time.

Figure 6:
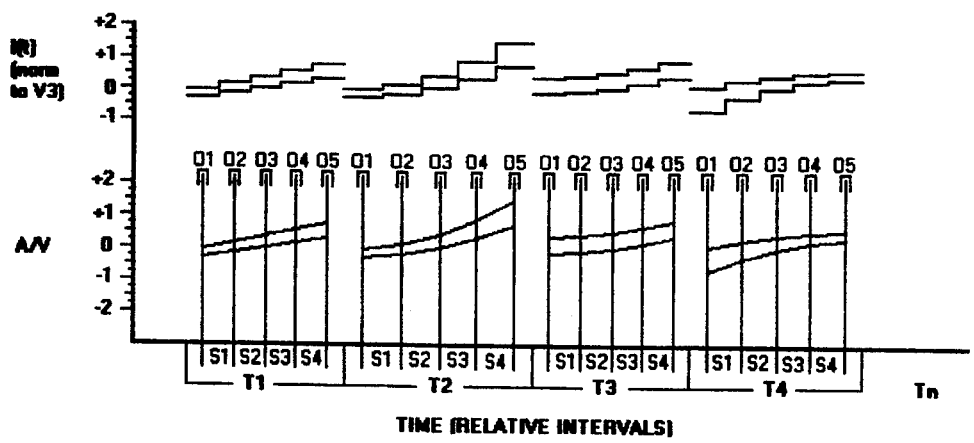
FIG. 6 is a timing diagram showing the FIG. 5 composite normalized and subsequent four-segment expressions of slope within each time interval.

FIG. 6 shows two relationships. The upper portion depicts the step responses obtained in FIG. 5 normalized at each V3, minimum load interval. The significant differences in response trends are readily observed at this point. The lower portion depicts the calculation and plotting of dual four-segment slopes, shown as S1 through S4, within each time interval using the ten points logged as V1 through V5 minimum and V1 through V5 maximum. Further refinement of slope accuracy is obtained by offsetting the start/end of each segment, shown as O1 through O5, where O1 represents deviation of V1 from ideal (105 V), O2 represents deviation of V2 from ideal, etc. Instabilities logged during sequence one, shown on FIG. 3 as T1$i$ through T4$i$, are added algebraically to each point (on the X axis) to ensure worst case values. The lines thus calculated are considered minimum and maximum load lines.

The preceding method of data acquisition calculates and stores, for each time interval, the following variables:

```
 1 minimum segment 1 slope
 2 minimum segment 2 origin voltage
 3 minimum segment 2 origin current
 4 minimum segment 2 slope
 5 minimum segment 3 origin voltage
 6 minimum segment 3 origin current
 7 minimum segment 3 slope
 8 minimum segment 4 origin voltage
 9 minimum segment 4 origin current
10 minimum segment 4 slope
11 maximum segment 1 slope
12 maximum segment 2 origin voltage
13 maximum segment 2 origin current
14 maximum segment 2 slope
15 maximum segment 3 origin voltage
16 maximum segment 3 origin current
17 maximum segment 3 slope
18 maximum segment 4 origin voltage
19 maximum segment 4 origin current
20 maximum segment 4 slope
```

As the preferred embodiment of data compression, the twenty data variables above are able to solve for all voltage-current points along both minimum and maximum limit lines. Presuming a typical voltage range of 103–127 VAC along both limit lines, at an expected resolution of 0.1 VAC, the resulting data compression ratio becomes: (127−103)(2)(10)/20=24:1.

Referring again to FIG. 1, the results of the previous operations are grouped as a packet and stored as interval T1 to RAM 215 under software control. Subsequent operations are treated similarly subject to the limits of available memory. A number of storage and control options are available when the previously assembled data is transferred to ELMPI 100, such as:

| | |
|---|---|
| 1 untimed series | where only a single data packet is required |
| 2 timed series | where (n) data packets + time interval markers are required |
| 3 packet per cycle | where one data packet = one time interval |
| 4 (n) packets per cycle | where (n) data packets = one time interval |

Single or combinations of the above options are selected, depending upon the general mode of operation of the appliance, such as:

| MODE | TYPICAL STORAGE MODES |
| --- | --- |
| single event | 1, 2, 3, 4 |
| continuous event | 1, 2, 3, 4 |
| single load current | 1, 3 |
| multiple load currents | 2, 4 |
| fixed sequence of load current values | 2, 3, 4 |
| variable sequence of load current values | 3, 4 |
| fixed timing of load current values | 2, 3 |
| variable timing of load current values | 3, 4 |
| stable load current values | 1, 3 |
| unstable load current values | 2, 4 |

The data transfer proceeds under user-initiated software control moving both control option coding and data packets, via EAROM driver 209, which provides the requisite drive lines and voltage levels, over connected EAROM programming cable 219 into EAROM 109. Once complete, the cable 219 is removed and ELMPI 100 contains complete operating data in non-volatile memory.

With operating data stored in ELMPI 100, independent operation may proceed with a voltage source connected to AC input 101 and the device to be protected connected to AC output 104 (interconnection details and options are discussed in relation to FIG. 2). The primary current path is established through current sensor 102 and output relay 103 normally open contacts. The sensing loop, consisting of signal level conditioning 105, multiplexer 106, Trms A/D converter 108, and microcontroller 107, sample input voltage, output voltage, and load current. Internal calibration port 111 is available during manufacture for external monitoring of overall non-linearities. Such data allows calculation and storage of additional calibration correction constants into EAROM 109. Operation is initiated at the first detection of load current. Control option coding data regulates the sequence and timing of the sampling comparisons. A continuous sapling series of output voltage and load current are averaged and compared to individually computed minimum and maximum points to ensure compliance, which is required to keep output relay 103 energized.

FIG. 2 shows the overall system of interconnection and use. ACTU 200, at the lower portion, is shown linked to program sources 308. The relationship to UUP 300, the purpose of which is to obtain operating data, has been discussed. Specifications 306, such as those details usually available to the manufacturer of the appliance, or ratings 307, such as those regulated by safety organizations and agencies, form alternate sources of operating data. A standard communications link, typically RS-232, provides such an alternate pathway. The various forms of the interrupter are shown functionally as ELMPI module 301, ELMPI cord end 302, ELMPI outlet 303, and ELMPI breaker 304. It can be seen that ELMPI 100 is the core unit of each form with components added to allow connection to input voltage, output load, and external programing. EAROM programming cable 219 is shown as being capable of connecting to and programming the forms shown.

Accordingly, it can be seen from the foregoing that the interrupter system of this invention is able to provide in proved circuit protection and electrical safety compared to levels available by using data derived from the actual unit under protection to provide real-time operating constraints. The advantages of this approach are that it uses a logical solution to the problem of defining normal vs. abnormal current levels; it relates currents to real-world fluctuations of line voltages, thereby minimizing errors; it includes consideration of loading effects of the unit under protection; it provides a range of forms which allow flexible placement to promote maximum safety; it allows the detection of early warning signals such as minor changes in current over time; and it encourages information transfer between sources of appliances and interrupters.

While the present invention has been described with reference to one or more particular embodiments, those skilled in the art will recognize that many changes may be made thereto without departing from the spirit and scope of the present invention. For example, the number of voltage interval steps shown in FIGS. 4, 5, and 6 is not necessarily limited to five voltage interval steps. The use of more than five voltage interval steps will improve accuracy. Furthermore, the method of data compression may be modified as long as it is able to give expected resolution subject to memory limitations. The ELMPI core unit may be implemented as a hybrid module instead of as a printed circuit board. An onboard audible alarm may be included to sound prior to disabling of output relay 103. The alarm is initiated by exceeding an intermediate limit. Multiple appliance operating profiles may be stored in the ELMPI core unit, selectable by common switching elements. Each of these embodiments and obvious variations thereof is contemplated as failing within the spirit and scope of the invention, which is set forth in the following claims.

What is claimed is:

1. A load interrupter system, operable in a data acquisition mode and a normal operating mode, for protecting a device connected to an electrical system, said load interrupter system comprising:

a test control unit coupled to the device during the data acquisition mode, said test control unit including signal generation circuitry for applying test signals to the device and a storage medium for storing responses of the device to said test signals;

processing circuitry for formatting said responses into an operating profile representative of limits of normal operation of the device; and an interrupter unit including a memory for receiving and storing said operating profile from said test control unit while connected thereto, said interrupter unit including an input connected to an input voltage source and an output connected to the device during the normal operating mode, said interrupter unit forming a current path between said input and said output and including a relay along said current path for breaking said current path, said interrupter unit including a load monitor for monitoring dynamic operating characteristics of the device relative to said operating profile and causing said relay to break said current path in response to said dynamic operating characteristics falling outside the limits of normal operation of the device.

2. The load interrupter system of claim 1, wherein said signal generation circuitry includes a line regulator and a multiple output transformer connected to an output of said line regulator, said line regulator providing said transformer with a stabilized output voltage in response to receiving a line voltage at an input of said line regulator.

3. The load interrupter system of claim 2, wherein said transformer includes selection taps controlled by respective drivers, and further including a controller for controlling said drivers to cause said transformer to generate a series of regulated voltage steps to the device while subjecting the device to varying load conditions.

4. The load interrupter system of claim 4, wherein said signal generation circuitry includes means for applying said test signals as a series of regulated input voltage steps to the device while subjecting the device to varying load conditions.

5. The load interrupter system of claim 4, wherein said means for applying said test signals includes a line regulator and a multiple output transformer.

6. The load interrupter system of claim 1, wherein said storage medium includes a random access memory.

7. The load interrupter system of claim 1, wherein said responses of the device to said test signals include data selected from the group consisting of voltage, current, load, and time data.

8. The load interrupter system of claim 1, wherein said processing circuitry includes means for compressing said responses.

9. The load interrupter system of claim 1, wherein said memory includes an electrically alterable read only memory (EAROM).

10. A method for protecting a device connected to an electrical system, comprising the steps of:

applying test signals to the device;

recording responses of the device to the applied test signals;

generating an operating profile for the device based on the recorded responses, the operating profile representing limits of normal operation of the device;

connecting the device to an input voltage source via an interruptible current path;

monitoring the interruptible current path by comparing dynamic operating characteristics of the device to the operating profile; and interrupting the current path in response to the dynamic operating characteristics falling outside the limits of normal operation of the device.

11. The method of claim 10, wherein said step of applying test signals to the device includes applying a series of regulated input voltage steps to the device while subjecting the device to varying load conditions.

12. The method of claim 10, wherein said step of recording responses of the device to the applied test signals includes recording voltage, current, load, and time data.

13. The method of claim 10, wherein said step of generating an operating profile for the device includes compressing the responses.

14. A method for protecting a device connected to an electrical system, comprising the steps of:

connecting the device to an input voltage source via a first current path;

applying test signals to the device using the first current path;

monitoring the first current path for data responsive to the test signals applied to the first current path and storing the data in a memory;

formatting the data into an operating profile representative of limits of normal operation of the device;

connecting the device to the input voltage source via a second current path;

monitoring the second current path by comparing dynamic operating characteristics of the device to the operating profile; and interrupting the current path in response to the dynamic operating characteristics falling outside the limits of normal operation of the device.

15. The method of claim 14, wherein said step of applying test signals to the device includes applying a series of regulated input voltage steps to the device while subjecting the device to varying load conditions.

16. The method of claim 14, wherein said data responsive to the applied test signals includes voltage, current, load, and time data.

17. The method of claim 14, wherein said step of formatting the data into an operating profile includes compressing the data.

18. A load interrupter system for protecting a device connected to an electrical system, said load interrupter system comprising:

means for applying test signals to the device and recording responses of the device to the applied test signals;

means for generating an operating profile for the device based on the recorded responses, the operating profile representing limits of normal operation of the device;

means for connecting the device to an input voltage source via an interruptible current path;

means for monitoring the interruptible current path by comparing dynamic operating characteristics of the device to the operating profile; and means for interrupting the current path in response to the dynamic operating characteristics falling outside the limits of normal operation of the device.

19. A load interrupter system for protecting a device connected to an electrical system, said load interrupter system comprising:

a test control unit coupled to the device, said test control unit including signal generation circuitry for applying test signals to the device and a storage medium for storing responses of the device to said test signals;

processing circuitry for formatting said responses into an operating profile representative of limits of normal operation of the device;

an interrupter unit including a memory for receiving and storing said operating profile from said test control unit while connected thereto, said interrupter unit including an input connected to an input voltage source and an output said interrupter unit forming a current path between said input and said output and including a relay along said current path for breaking said current path, said interrupter unit including a load monitor for monitoring dynamic operating characteristics of the device relative to said operating profile and causing said relay to break said current path in response to said dynamic operating characteristics outside the limits of normal operation of the device; and an external programming source connected to said test control unit for sending data to said control test unit, said data comprising electrical specifications and ratings of said device.

* * * * *